United States Patent [19]
Bollinger et al.

[11] 3,907,127
[45] Sept. 23, 1975

[54] APPARATUS FOR STACKING SHEET MATERIAL

[75] Inventors: Dwight A. Bollinger, Hadley; William P. Cathers, Allison Park; Harry S. Koontz, Pittsburgh, all of Pa.

[73] Assignee: PPG Industries, Inc., Pittsburgh, Pa.

[22] Filed: Dec. 13, 1973

[21] Appl. No.: 424,507

[52] U.S. Cl.............. 214/6 DS; 214/6 M; 271/224
[51] Int. Cl.² ........................................ B65G 57/00
[58] Field of Search ........ 214/6 DS, 6 D, 6 S, 6 FS, 214/6 M; 271/224; 65/36, 168

[56] References Cited
UNITED STATES PATENTS

| | | | |
|---|---|---|---|
| 1,107,859 | 8/1914 | Stevens | 214/6 S |
| 1,623,195 | 4/1927 | Maxner | 214/6 S |
| 2,585,076 | 2/1952 | Bandura et al. | 271/224 |
| 2,626,800 | 1/1953 | Martin | 271/188 |
| 2,761,682 | 9/1956 | Buccicone | 271/224 |
| 3,202,302 | 8/1965 | Insolio | 214/6 DS |
| 3,480,160 | 11/1969 | Barradell-Smith et al. | 214/6 DS |

*Primary Examiner*—Frank E. Werner
*Assistant Examiner*—Lawrence J. Oresky
*Attorney, Agent, or Firm*—Donald Carl Lepiane

[57] ABSTRACT

Disclosed is an improved stacking apparatus of the type including a vacuum conveyor for moving individual successive sheets e.g., glass sheets, along a confined path from a first position to a second position e.g., a stacking station and facilities for successively releasing the sheets from the conveyor to move along a trajectory path toward the second position. The improvement includes (1) facilities for applying an interleaver material to a surface of the sheets as they are moved along the path; (2) facilities operating on the releasing facilities to release the individual sheets from the conveyor at a preselected position along the path; (3) facilities for removing foreign particles e.g., glass chips, from the stacking station; and (4) facilities for aligning the individual sheets at the stacking station.

12 Claims, 12 Drawing Figures

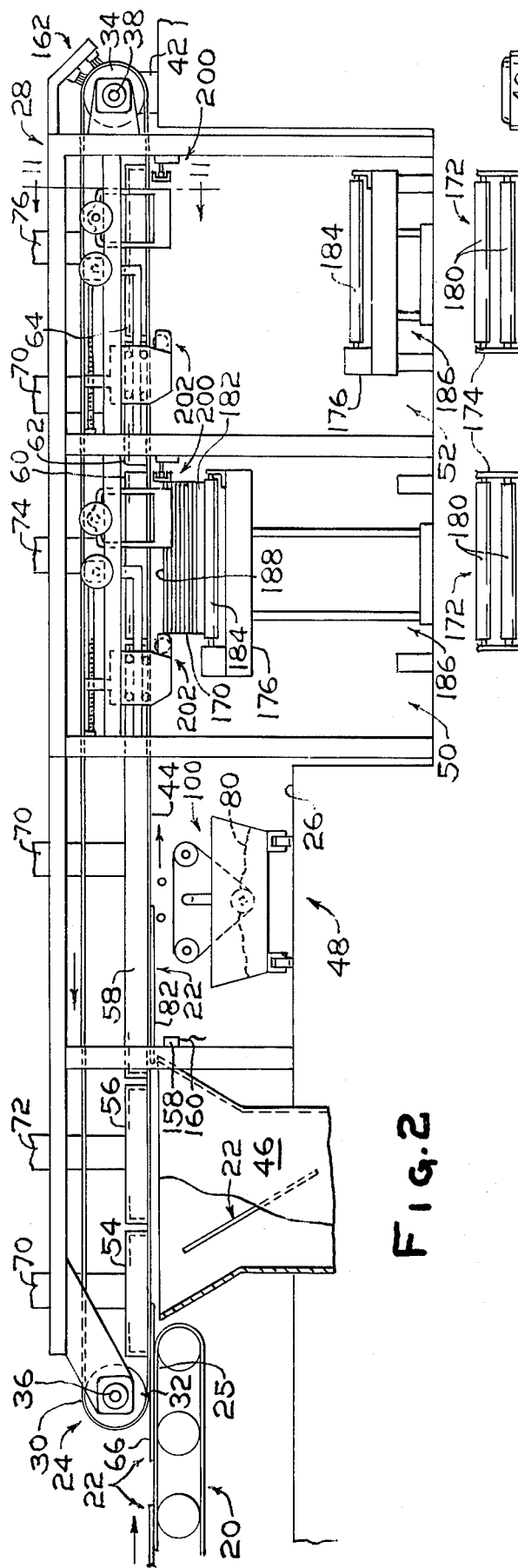
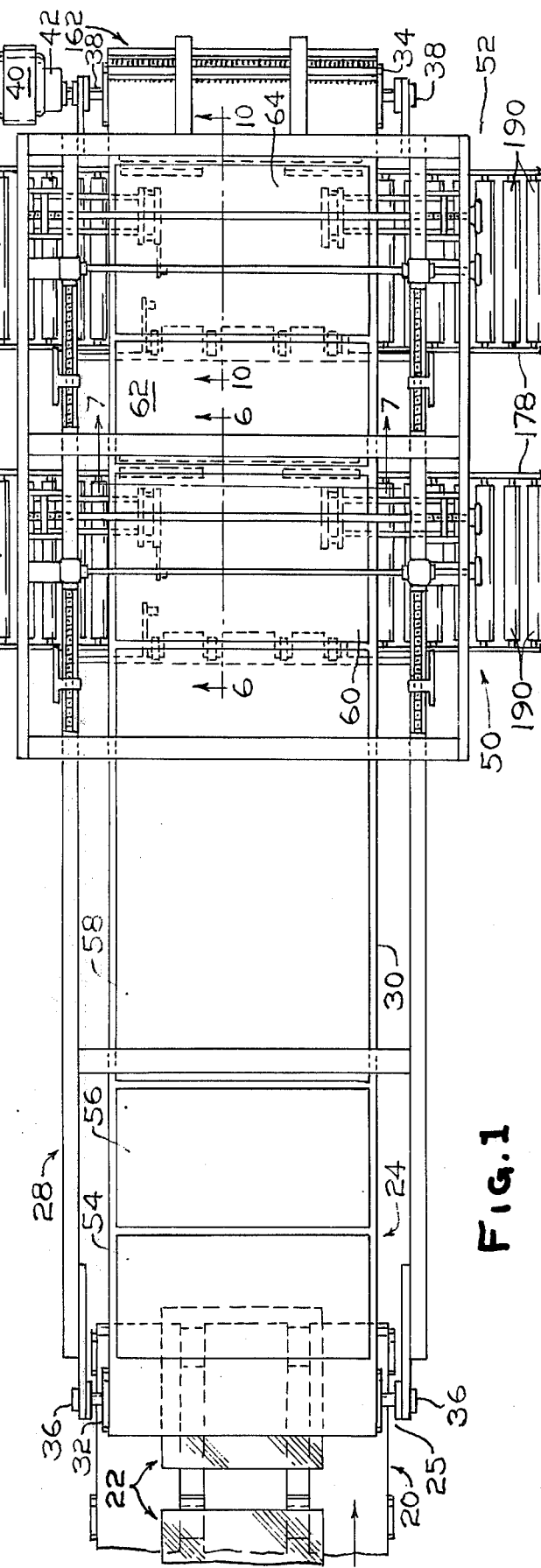

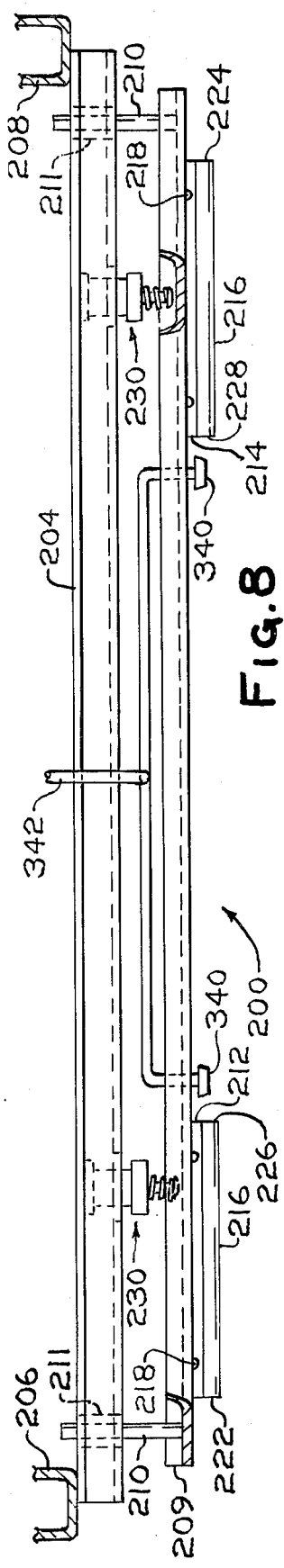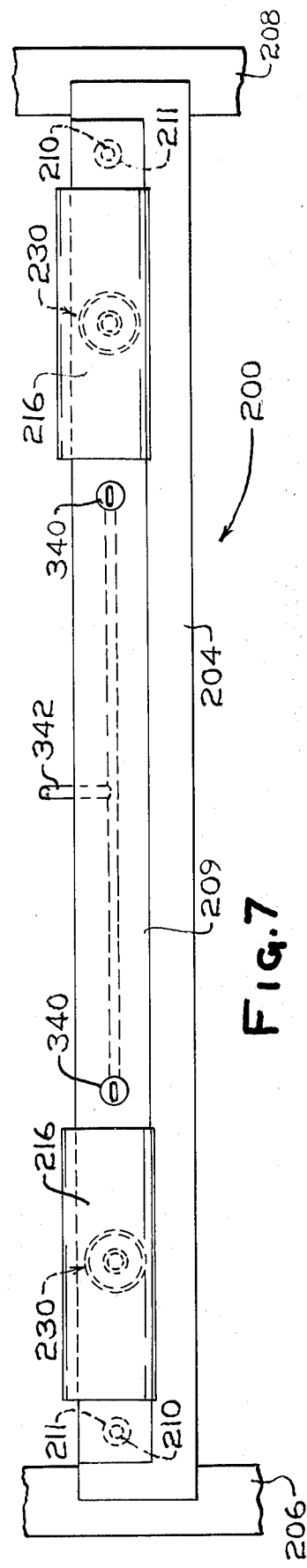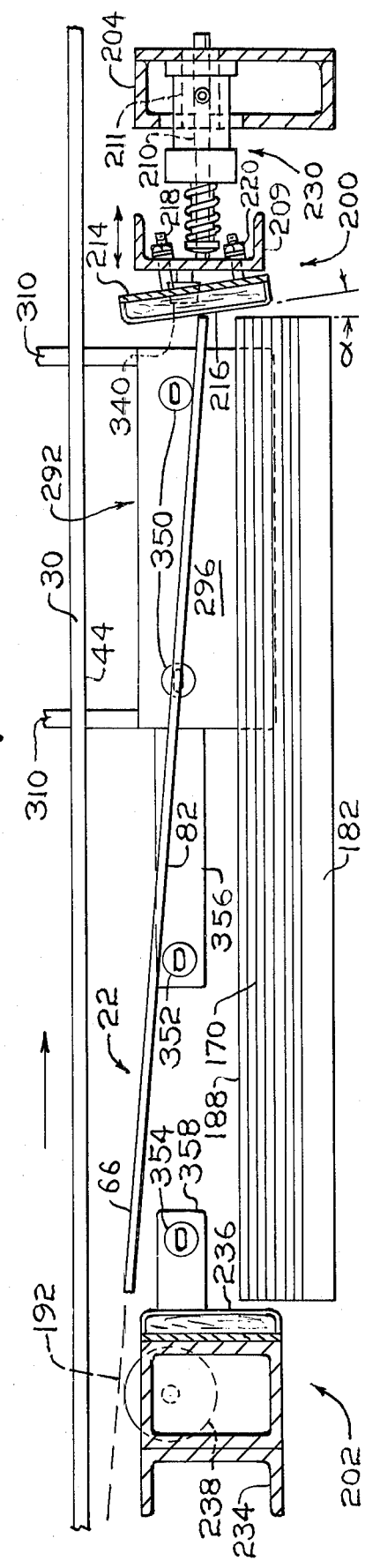

APPARATUS FOR STACKING SHEET MATERIAL

RELATED APPLICATIONS

The lead edge stop device disclosed in U.S. patent application Ser. No. 424,592 filed even date in the name of William P. Cathers and entitled "Lead Edge Stop Device" and the chip blow-off device disclosed in U.S. patent application Ser. No. 424,586 filed even date in the name of Dwight A. Bollinger and William P. Cathers and entitled "Device for Removing Chips From a Stacking Station" may be used with the apparatus of this invention. The disclosures of the above-mentioned applications are hereby incorporated by reference.

BACKGROUND OF THE INVENTION

1. Field of the Invention

The presen t invention relates to an improved apparatus of the type for stacking sheet material e.g., glass sheets.

2. Discussion of the Prior Art

At the present time, there are available apparatuses for transferring individual sheets from a first position to a second position where the individual sheets are arranged in a stack. One such transferring stacking apparatus is disclosed in U.S. Pat. No. 3,480,160.

In general, the apparatus of the above-mentioned patent discloses a conveyor for transferring sheets on the lower reach of an endless perforated belt conveyor. A vacuum is applied through the belt to pick up individual sheets and move them toward a stacking station located under the belt conveyor. As the sheet approaches the stacking station, the sheet is released from the belt by either prying the leading edge of the sheet from the belt to break the vacuum or shutting off the vacuum. The released sheet moves along a trajectory path toward the stacking station. At the stacking station, facilities are provided for arresting the movement of the sheet and aligning the individual sheets in a stack.

Several expediencies are disclosed in the above-mentioned patent for aligning the individual sheets in a stack. For example, the leading edge and trailing edge of the sheet are aligned with the stack by providing a lead edge stop and a trial edge stop. In general, the lead edge stop is a padded member that is (1) parallel to the adjacent side of the stack and in the trajectory path of the sheet; and (2) pivotally mounted and biased toward the trail edge stop. The lead edge stop arrests the motion of the sheet as it moves along the trajectory path and urges it toward the trail edge stop. The trail edge stop engages the trailing edge of the sheet as it rebounds from the lead edge stop and urges the sheet toward the lead edge stop. The trail edge stop is disclosed in the above-mentioned patent as (1) an air curtain that engages the trailing edge of the sheet or (2) a pneumatic ram that cooperates with the lead edge stop to align the sheet with the stack. Another expediency for stacking the sheet includes inclining the belt conveyor at about 5° in the direction of movement of the lower reach of the belt and 5° in a direction transverse to the belt. The released sheet floats on a layer of trapped air between the falling sheet and the top sheet of the stack into abutment against a lead edge stop and a side alignment member.

The expediencies disclosed in the above-identified patent for aligning sheets in a stack have several drawbacks. More particularly, when the leading edge of the sheet engages the lead edge stop, the distance between the lead edge stop and trail edge stop increases to such a degree that the trailing edge of the sheet slides along the uppermost surface of the stack instead of engaging the trail edge stop. This is termed trail corner chipping and results in damage to the falling sheet as well as the last positioned sheet on the stack.

Another drawback is that there is no provision for removing particles of glass from the falling sheet. These particles of glass result when flares are at the cut edge e.g., the leading edge or trailing edge, of the glass break away as the leading edge and/or trailing edge of the glass engage the lead edge stop or trail edge stop, respectively. When the particles of glass become trapped between adjacent surfaces of stacked sheets, the surfaces of the glass are scratched.

The above-mentioned patent further discloses facilities e.g. an air nozzle, for sensing the presence of the sheet on the belt to actuate the release facilities to release the sheet from the belt. These sensing facilities have drawbacks. More particularly, provisions must be made to keep the nozzles clean. Any drop in the pressure would actuate the release facilities prematurely. When this occurs, the falling sheet will undershoot the lead edge stop and the leading edge of the sheet hits the surface of the last sheet on the stack, damaging the sheets of glass.

It would therefore be advantageous if a stacking apparatus were provided that eliminated the problems associated with the prior art stacking apparatuses.

SUMMARY OF THE INVENTION

This invention relates to improvements in stacking apparatuses of the type for stacking individual sheets e.g., glass sheets, on a receiving surface including a loading position; conveying facilities moveable along a path spaced above the receiving surface and the loading position for engaging successive individual sheets at the loading position and for conveying the individual sheets toward the receiving surface; and facilities operating on the conveying facilities for releasing the sheet from the conveying facilities to move the sheet along a trajectory path toward the receiving surface.

The improvements include (1) facilities for engaging the sheet as it moves along the trajectory path and for aligning the sheet with the receiving surface; (2) facilities for cleaning the receiving surface and uppermost surface of the sheet to be stacked; (3) facilities for monitoring the movement of the sheets as they move along the path from the loading position to the receiving position; and (4) facilities responsive to the monitoring facilities for actuating the releasing facilities to release the sheet from the conveyor to move the sheet along a trajectory path into engagement with said engaging and aligning facilities and for actuating the cleaning facilities to clean the receiving surface and the uppermost surface of the sheet to be stacked.

The improvements further include facilities for applying interleaver material to the bottom surface of the glass as it is conveyed toward the receiving surface.

In the preferred embodiment, the engaging facilities include a lead edge stop device for engaging the leading edge of the sheet as it moves along the trajectory path to decelerate the sheet to a zero acceleration and for urging the trailing edge of the sheet toward a trail edge stop device. The lead edge stop device includes a rigid member having a resilient surface. The resilient surface extends above the receiving surface and is inclined away from the trail edge stop device to eliminate trail corner chipping.

The cleaning facilities include a first stream of fluid, e.g., air, to clean the receiving surface and a second stream of fluid, e.g., air, to remove chips of glass from the uppermost surface of the falling sheet. The chips of glass result from flares at the cut edges of the glass being broken away as the leading edge and trailing edge of the sheet of glass engage the lead edge stop and the trail edge stop devices respectively.

BRIEF DESCRIPTION OF THE DRAWING

FIG. 1 is a plan view of a stacking apparatus having portions removed for purposes of clarity incorporating the features of this invention for stacking individual sheets;

FIG. 2 is a side view of the apparatus of FIG. 1;

FIG. 6 is a view of a stacking station taken along lines 6—6 of FIG. 1 having portions removed for purposes of clarity illustrating the engaging and aligning facilities and cleaning facilities of the invention;

FIG. 7 is a front view of the lead edge stop device of this invention taken along lines 7—7 of FIG. 1 illustrating a lead edge stop device of this invention:

FIG. 8 is a top view of FIG. 7 and having portions removed for purposes of clarity;

DESCRIPTION OF THE INVENTION

Figure 3A:
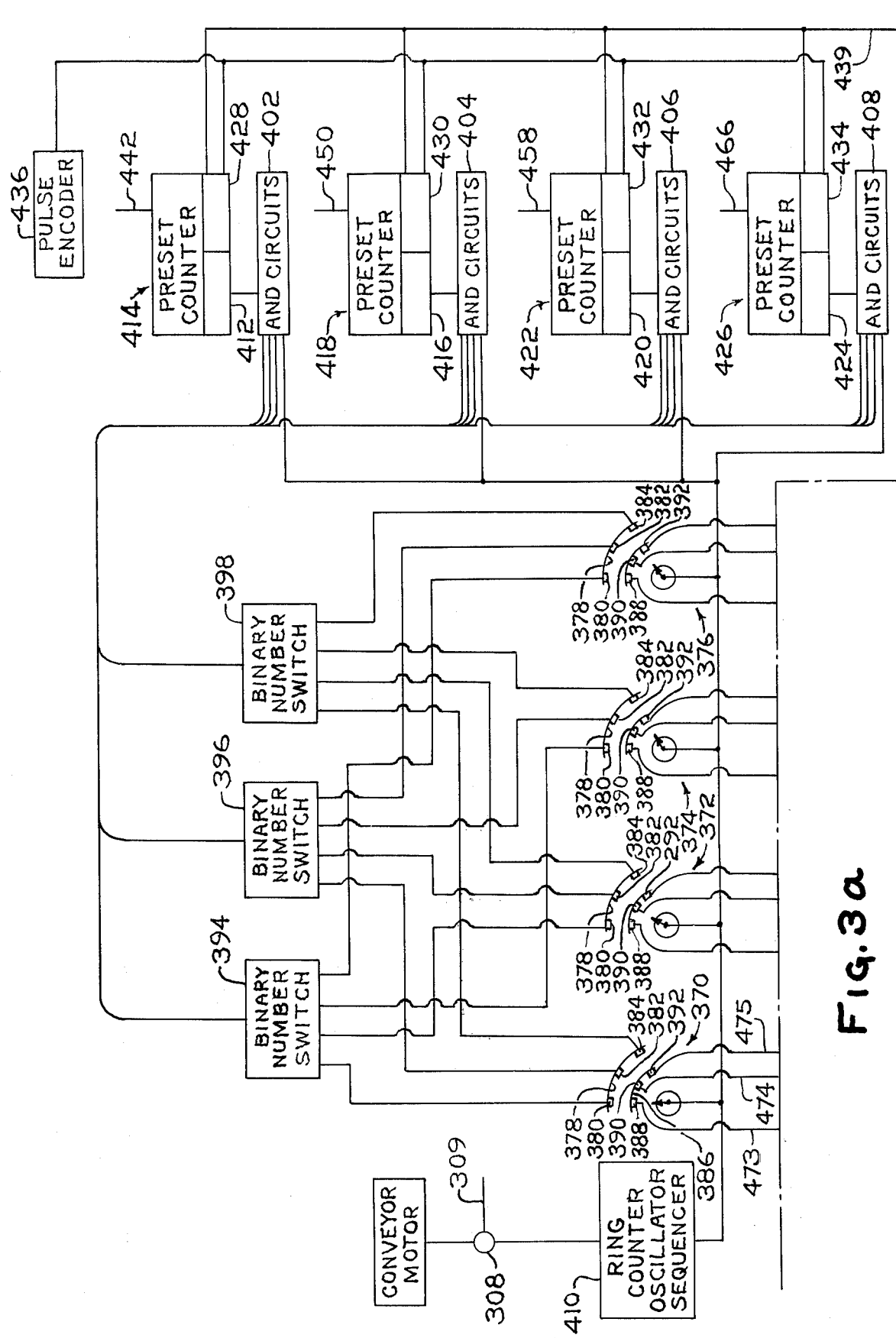
FIGS. 3a and 3b illustrate a preferred embodiment of an electrical system for practicing the invention.

In general, this invention relates to a stacking apparatus that includes (1) facilities for transferring successive individual sheets from a first position toward a second position e.g., a stacking station, (2) facilities for releasing the sheet from the transferring facilities to move the sheet along a trajectory path toward the second position; (3) facilities for removing foreign particles from the stacking station that can damage the surface of the sheets; and (4) facilities for stacking the idividual sheets at the stacking station.

In this discussion, certain terms will be used. These terms will now be discussed for purposes of clarity. "Sides of the sheet" are the opposed sides of the sheet between the leading edge and the trailing edge of the sheet. The "width of the sheet" is measured between the leading edge and trailing edge of the sheet. The "length of the sheet" is measured between the sides of the sheet.

The discussion of the invention will be directed to stacking individual glass sheets. However, as will be appreciated by those skilled in the art, the invention is not limited thereto. More particularly, sheets of any rigid material such as metal or plastic may be stacked using the apparatus of this invention.

Referring to FIGS. 1 and 2, there is shown a horizontal conveyor 20 for successively moving individual sheets of glass 22 toward and under a portion of endless type conveyor 24 e.g., into a loading position 25. The endless conveyor 24 is supported above floor 26 in any conventional manner as by superstructure 28. The endless conveyor 24 includes a perforated belt 30 having its course around an idler roller 32 and a power roller 34 and joined at its ends. The idler roller 32 is mounted for rotation on the superstructure 28 at 36 in any conventional manner. If desired, the idler roller 32 may be mounted, in any conventional manner, to keep the belt 30 under tension. The power roller 34 is mounted for rotation on the superstructure 28 at 38 and is continuously driven by a motor 40 through a gear reducer 42 (shown in FIG. 1). Rotating the power roller 34 in a counter clockwise direction as viewed in FIG. 2 moves lower reach 44 of the belt 30 from left to right as viewed in FIG. 2 along a path from the loading position 25 over a plurality of stations e.g., a cullet bin 46, an interleaver applicator station 48, a first stacking station 50 and a second stacking station 52.

Positioned above the lower reach 44 of the endless belt 30 are vacuum chambers, 54, 56, 58, 60, 62 and 64 which apply a vacuum through the lower reach 44 of the belt 30 to urge uppermost surface 66 of the sheet of glass 22 against the belt 30 at the loading position 25 and for moving the sheet of glass from the loading position 25 toward the stations 46, 48, 50 and 52. The vacuum chambers 54, 58 and 62 are connected to a vacuum supply 68 by conduit 70 (see FIGS. 2 and 3b). The vacuum chambers 56, 60 and 64 are connected to the vacuum supply 68 by conduits 72, 74 and 76 respectively, (see FIGS. 1 and 3b). Vacuum of up to 15 inches of water is sufficient for holding sheets of glass having dimensions of up to 40 × 80 × 3/32 inches.

With continued reference to FIGS. 1 and 2, sheets of glass 22 such as those cut from a glass ribbon (not shown) are moved along the horizontal conveyor 20 toward the loading position 25. At an inspection station located before the loading position 25, the horizontal conveyor 20 is stopped and each of the sheets is inspected for size and defects such as optical defects or cracks. Sheets of an acceptable size and free of defects are programmed for either the first or second stacking station 50 or 52 respectively. Sheets of glass that have either an unacceptable size or defects are programmed for the cullet bin 46. As can be appreciated, during the inspection of the sheets of glass, the horizontal conveyor 20 is preferably stopped to allow for the inspection of the sheets. However, if the sheets are automatically inspected, the horizontal conveyor 20 may be continuously operated.

After the disposition of the sheets has been determined, the horizontal conveyor 20 successively moves individual sheets into the loading position 25. At the loading position, the uppermost surface 66 of the sheet of glass moves into surface contact with the lower reach 44 of the belt 30 and is held thereto by vacuum applied by the vacuum chamber 54. As the belt 30 is moved from left to right as viewed in FIG. 2 the sheet is moved away from the loading position 25 toward the other stations.

Figure 3B:
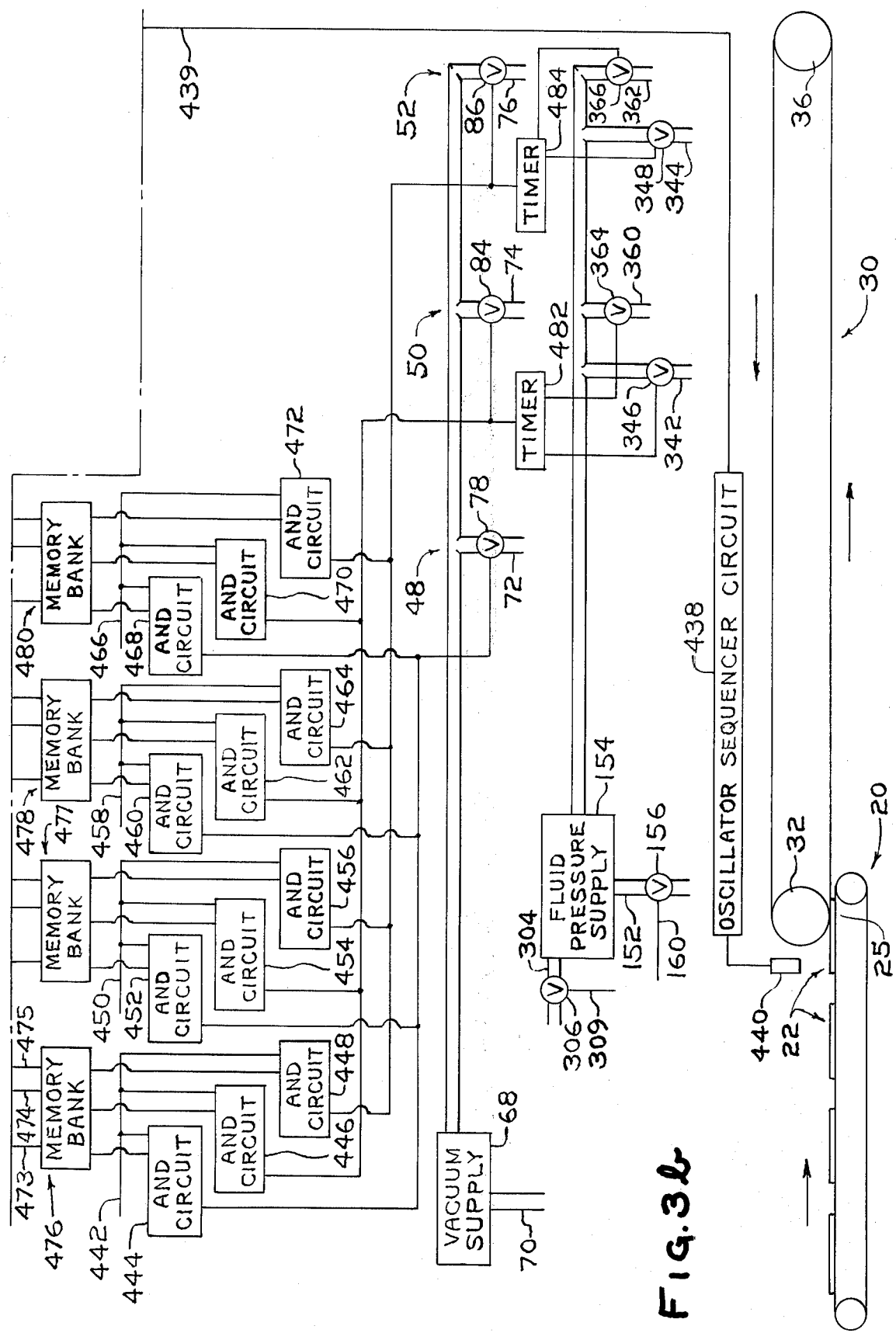

With reference to FIGS. 2 and 3b, if a sheet of glass is programmed for the cullet bin 46, solenoid 78 mounted on the conduit 72 is momentarily closed as the sheet moves past the vacuum chamber 56 to release the sheet from the endless belt 30. The sheet drops into the cullet bin 46. If a sheet of glass is programmed for the first or second stacking stations 50 or 52 respectively, the solenoid 78 remains in its normally open position and the sheet is maintained against the lower reach 44 of the belt 30 by vacuum chambers 54, 56 and 58. The sheet is conveyed by the endless belt 30 past the cullet station 46 and past the interleaver station 48 where an interleaver material 80 is applied to bottom surface 82 of the sheet 22. If the sheet is programmed for the first stacking station 50, solenoid 84 mounted on conduit 74 is momentarily closed as the sheet moves past the vacuum chamber 60 and the sheet is released from the belt 30 and moves along a trajectory path into the first stacking station 50. If the sheet is programmed for the second stacking station 52, the solenoid 84 remains in its normally open position and vacuum is applied to the sheet by way of vacuum chambers 60 and 62 to convey the sheet toward the second stacking station 52. As the sheet moves past vacuum chamber 64, solenoid 86 mounted on conduit 74 is momentarily closed and the sheet is released from the belt 30 and moves along a trajectory path into the second stacking station 52.

Figure 4:
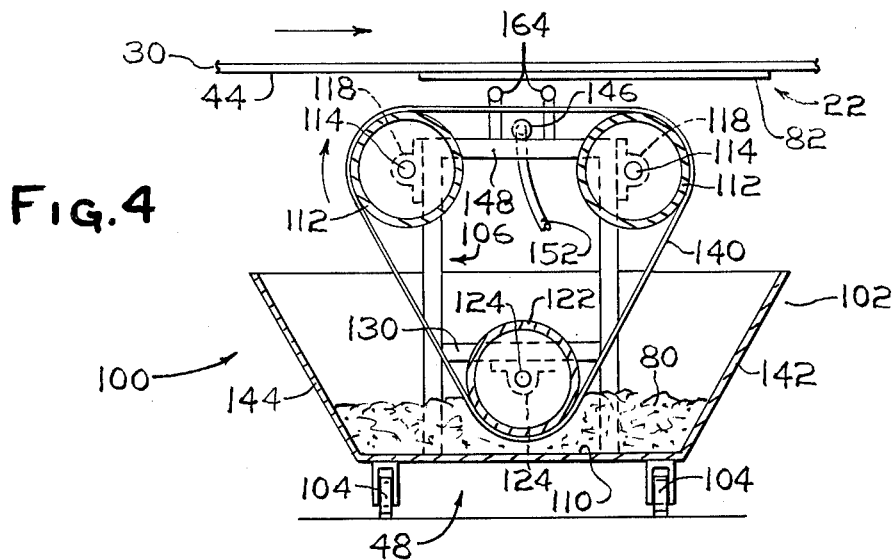
FIG. 4 is a side view of a powder interleaver applicator having portions cut away for purposes of clarity incorporating features of this invention for applying interleaver material to bottom surface of a sheet as it moves toward a stacking station.
Figure 5:
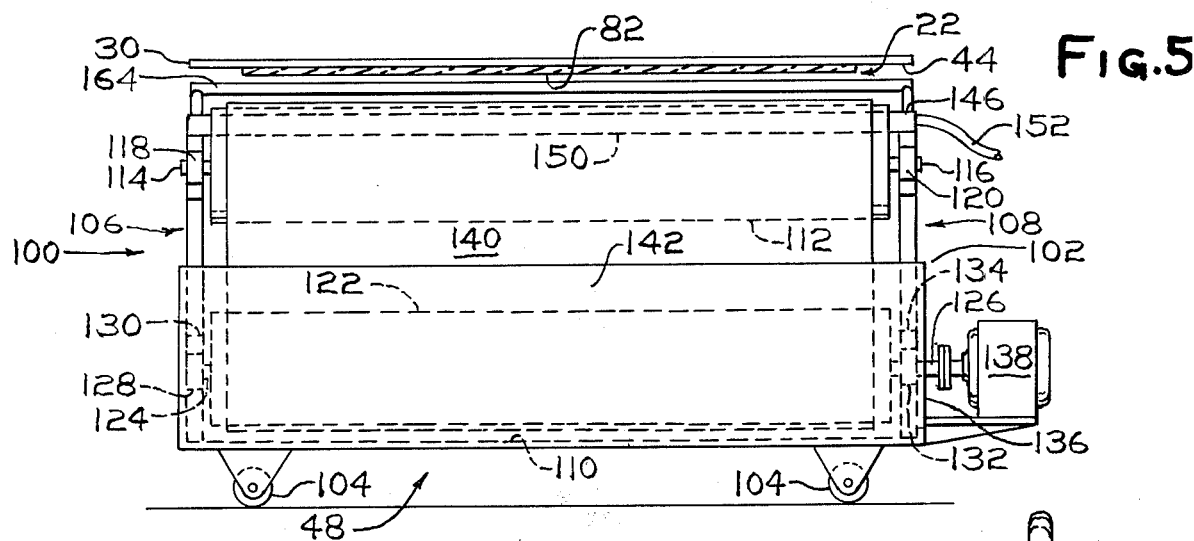
FIG. 5 is a front view of the applicator of FIG. 4.

The sheets of glass that are to be stacked have an interleaver material such as wood flour or powdered acidic material applied to a surface of the glass e.g., the bottom surface 82, so as to provide interleaver material between adjacent surfaces of the sheets of glass when they are stacked. The interleaver material prevents the surfaces of the glass from being scratched as adjacent surfaces are rubbed against each other and provides ease of separating the sheets of glass. As can be appreciated, the interleaver material may be applied using any of the well-known interleaver applicators. With reference to FIGS. 4 and 5, there is shown a powder interleaver applicator 100 that has proven satisfactory.

The applicator 100 includes a container 102 which may be mounted on wheels 104 for ease of moving the applicator 100 from beneath the belt 30 for maintenance or loading the container 102 with the interleaver material 80.

A pair of "A" shaped frame members 106 and 108 are securely mounted in spaced relationship, in any conventional manner, to the bottom surface 110 of the container 102 as shown in FIGS. 4 and 5. A pair of idler rollers 112 each have a centrally disposed shaft 114 securely mounted at one end and a centrally disposed shaft 116 securely mounted at the opposite end (shown better in FIG. 5). The shafts 114 and 116 are mounted in bearings 118 and 120 respectively. The bearings 118 are mounted on opposite sides of the frame member 106 and bearings 120 are mounted on opposite sides of the frame member 108 as shown in FIGS. 4 and 5 so that the idler rollers 112 are in spaced relationship and freely rotatable.

A power roller 122 has a centrally disposed shaft 124 securely mounted to one side and a centrally disposed shaft 126 mounted to the other side. The shaft 124 is mounted in a bearing 128 mounted on cross member 130 of the frame 106. The shaft 126 passes through a bearing 132 mounted on cross member 134 of the frame member 108 and passes through wall 136 of the container 102. The end of the shaft 126 is connected to a motor 138.

A stainless steel screen 140, preferably having a 50 × 50 mesh, is joined at its ends to form an endless conveyor. The screen 140 is mounted about the idler rollers 112 and power roller 122 with sufficient tension so that rotation of power roller 122 by motor 138 moves the screen in a clockwise direction as viewed in FIG. 4. To further assist the movement of the screen, the surface of the rollers 112 and 122 may be advantageously provided with a friction surface for example a rubber coating or roughening the surface. Preferably, the side to side dimension of the screen 140 should be greater than the width of the sheet to assure adequate coverage of the surface 82 of the sheet 22. However, it has been found that the surface 82 need not be covered completely. For example, the interleaver material may be applied to the surface 82 of the sheet 22 about 3-4 inches in from each side.

It is preferred that the idler rollers 112 and power roller 122 be arranged relative to one another so that the screen 140 is moved along a triangular path such that the screen 140 as it passes over the idler rollers 112 is parallel to and spaced about 4 inches from the bottom surface 82 of the sheet moving through the station 48. The power roller 122 is preferably equal distance from inwardly sloping sides 142 and 144 (see FIG. 4) of the container 102 so as to urge the interleaver material 80 toward the screen 140 as it passes through the interleaver material 80. As the mesh screen 140 is rotated through the interleaver material 80, the interleaver material adheres to the surface of the screen and is carried by the screen toward the bottom surface 82 of the sheet 22.

Positioned between the idler rollers 112 and beneath the screen 140 is a slot nozzle 146. The slot nozzle 146 is mounted in any conventional manner at opposed ends to cross members 148 and 150 of frame members, 106 and 108 respectively. The slot nozzle 146 is connected by a conduit 152 to a pressurized fluid generator 154 (see FIG. 3b). The pressurized fluid e.g., air, moving from the slot nozzle 146 is directed through the screen 140 to urge the material on the screen toward the bottom surface 82 of the sheet. Air pressures of about 1 to 5 psi have been found to be satisfactory to move interleaver material from the surface of the screen 140 onto the bottom surface 82 of the sheet 22.

For economic considerations and to prevent clogging of the perforated belt, a solenoid 156, normally in the closed position, may be mounted on the conduit 152 (see FIG. 3b). The solenoid 156 may be operated by a sensing device 158 (see FIG. 2) such as a microswitch connected to the solenoid 156 by a wire 160. As a side of the sheet engages the microswitch 158, the solenoid 156 opens to move pressurized air through the nozzle 146 to blow the interleaver material from the screen 140 onto the surface 82 of the sheet. The motor 138 continually operates against the interleaver material to rotate the screen at about 20 feet per minute.

With reference to FIGS. 1 and 2, there is shown a brush assembly 162 mounted along the course of the endless belt 30 e.g., adjacent power roller 34. The brush assembly 162 cleans the belt to remove any interleaver material adhered thereto as well as foreign particles such as glass chips that may mar the uppermost surface 66 of the sheet 22.

To assure adhesion of the interleaver material 80 to the bottom surface 82 of the sheet 22, a pair of static tubes 164 may be advantageously mounted on the members 106 and 108 between the lower reach 44 of the belt 30 and the mesh screen 140 about the air flow from the slot nozzle 146. As the interleaver material passes between the static tubes, a positive charge is applied to the interleaver material to provide better adherence of the interleaver material to the surface 82 of the sheet 22.

As the belt 30 continues to rotate, the sheet 22 having the interleaver material 80 on the bottom surface 82, is moved toward the first and second stacking stations 50 and 52 respectively.

The first and second stacking station 50 and 52 respectively, are identical in construction. Therefore, the first stacking station 50 will be discussed with the understanding that the discussion is applicable to the second stacking station 52 unless indicated otherwise. Further, unless stated otherwise, like numerals refer to like elements at the first and second stacking station.

With reference to FIG. 2, the stacking station 50 is mounted below the floor level 26 to receive the sheets as they drop from the lower reach 44 of the belt 30 and arrange the sheets in a stack 170. Referring also to FIG. 1, a horizontal conveyor 172 having three sections, 174, 176 and 178 respectively, is positioned below the belt 30 transverse to the path of the belt 30. The distance between the conveyor 172 and the lower reach 44 of the belt 30 is a function of the desired height of the stack 170 of sheets 22. Normally, the distance between the lower reach 44 of the belt 30 and the horizontal conveyor 172 is about 3 feet.

The first section 174 of the conveyor 172 has freely rotatable rollers 180 for moving a platen 182 onto rollers 184 of the second section 176. The second section 176 is detachably secured to the first and third sections 174 and 178 respectively, of the conveyor 172. The second section 176 is mounted on an elevator mechanism 186 to (1) raise the section 176 and platen 182 into position beneath the belt 30 to receive the sheets as they are released from the belt 30 and (2) to index the second section 176 and platen 182 downward after a sheet 22 is deposited on the platen.

Indexing the platen 182 downward after each sheet is deposited thereon maintain receiving surface 188 e.g., the surface of the platen, or the uppermost surface 66 of the last deposited sheet (see also FIG. 6) at a set distance from the lower reach 44 of the endless belt 30. As will be appreciated, this arrangement has distinct advantages which will be discussed in detail below.

When the platen 182 has a stack 170 of sheets 22, the second section 176 of the conveyor 172 is aligned with the first and third section 174 and 178 respectively, by the elevator mechanism 186. The rollers 184 and 190 of the second and third sections 176 and 178 respectively, of the conveyor 172 which are preferably motor operated move the platen 182 loaded with the sheets from the stacking station as an empty platen is moved onto the second section 176 of the conveyor 172.

The elevator mechanism 186 may be operated in any conventional manner to maintain the distance between the receiving surface 188 and the lower reach 44 of the belt 30 constant. For example, a sensing device (not shown) such as a photocell senses the level of the receiving surface and operates on the elevator mechanism to lower the elevator mechanism 186 each time a sheet is deposited on the receiving surface 188.

With reference to FIG. 6 positioned along trajectory path 192 of the sheet 22 is a lead edge stop device 200 of the type disclosed in U.S. patent application Ser. No. 424,592 filed even date in the name of W. P. Cathers and entitled "Lead Edge Stop Device" which disclosure is hereby incorporated by reference. The leading edge of the sheet engages the lead edge stop device 200 and rebounds therefrom. In other words, the lead edge stop device absorbs the force of the moving sheet to decelerates the sheet to zero accleration and thereafter urges the sheet toward a trail edge stop device 202 to move the trailing edge of the sheet into engagement with the trail edge stop device 202.

Referring now to FIGS. 6, 7 and 8 the lead edge stop device 200 includes a rigid member 204 securely mounted at its ends to posts 206 and 208 of a superstructure 28. A channel member 209 is slideably attached to the cross member 204 by a pair of shafts 210 mounted at opposed ends to the channel member 209 and passing through bushings 211 mounted on the cross member 204 (shown better in FIG. 8). A pair of rigid members 212 and 214 each covered with a resilient pad 216 are provided at their ends with a pair of threaded shafts 218 which pass through nuts 220 captured on the channel member 209 (see FIGS. 6 and 8).

With specific reference to FIG. 8, the distance between side 222 of the rigid member 212 and side 224 of the rigid member 214 is at least equal to the largest length of a sheet to be stacked e.g., 80 inches. The distance between sides 226 and 228 of the rigid members 212 and 214 respectively, is less than the smallest length of the sheet to be stacked e.g., 40 inches. As can be appreciated, instead of the two rigid members 212 and 214, a solid member having a resilient covering may be used.

The resilient pads 216 (see FIG. 6) prevent the leading edge of the sheet from being damaged. The pads may be made of an one-eighth inch thick covering of gum rubber over a one-half inch thick layer of foam shock absorbing rubber or any equivalent thereof e.g., a one-half inch thick layer of Ensolite.

With reference to FIG. 6, the surface of the pad 216 and the leading edge of the stacked sheets 170 subtend an oblique angle $\alpha$. This feature of the invention will be discussed in more detail below.

With reference to FIGS. 6, 7 and 8, there is shown a pair of shock absorbers 230 mounted in spaced relation on the rigid member 204 and acting on the channel member 209. As the leading edge of the sheet engages the pads 216, the rigid members 212 and 214 and the channel member 209 are urged toward the cross member 204 against the action of the shock absorbers 230. The shock absorbers 230 absorb the force of the sheet and thereafter urge the channel member 209 and rigid members 212 and 214 away from the rigid member 204 to move the sheet away from the lead edge stop device 200 and to move the trailing edge of the sheet into engagement with the trail edge stop device 202.

Figures 9, 10:
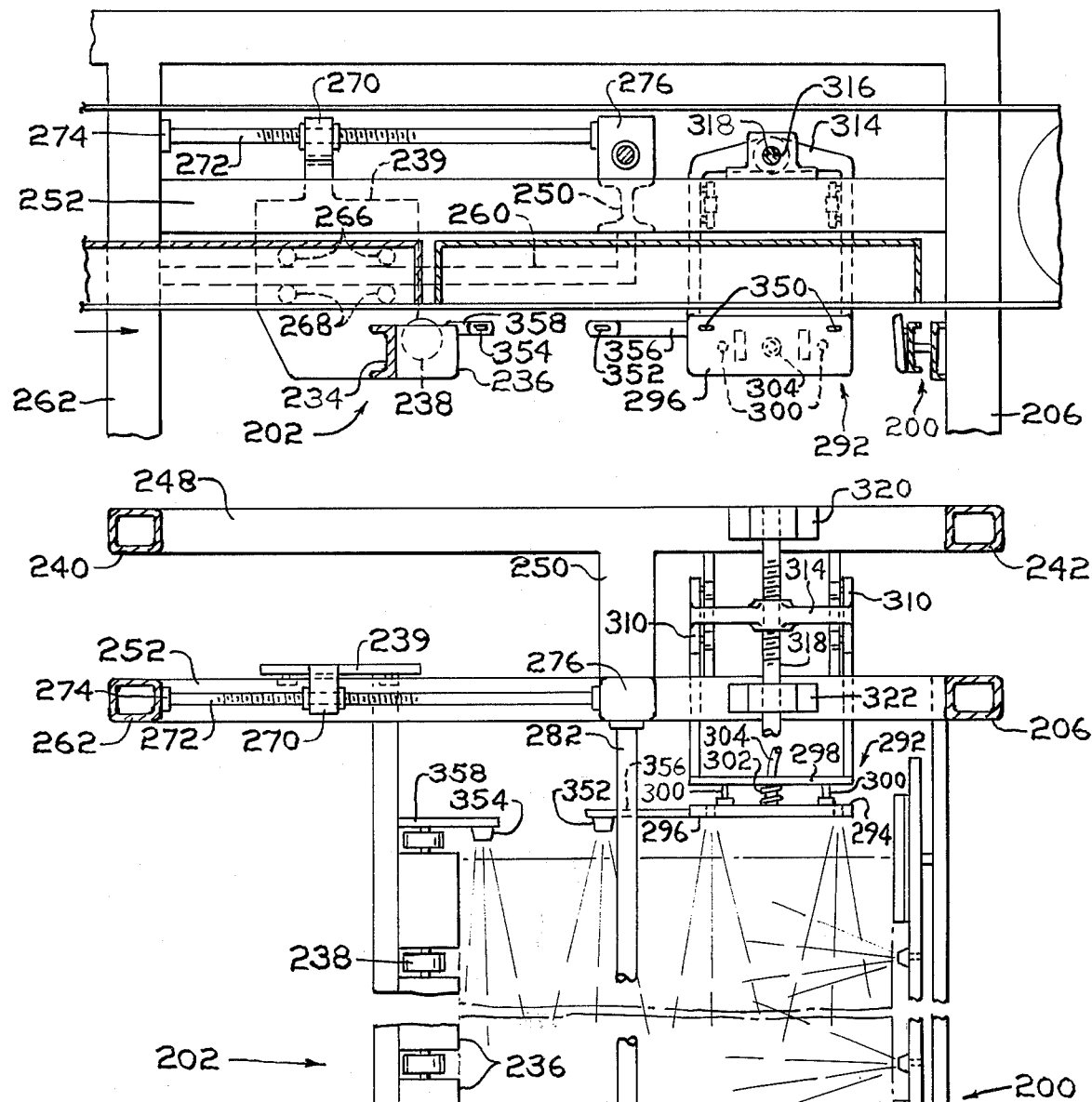
FIG. 9 is a plan view of a stacking station having portions removed for purposes of clarity.
FIG. 10 is a view taken along lines 10—10 of FIG. 1.

With reference to FIGS. 6, 9 and 10, the discussion will now be directed to the trail edge stop device 202. The trail edge stop device 202 includes a rigid member 234 having a plurality of spaced resilient pads 236 mounted thereon. The pads 236 are similar in construction to the pads 216 of the lead edge stop device 200. Mounted between the pads 236 are freely rotatable wheels 238 having their periphery recessed between the surface of the pads facing the lead edge stop device 200 and extending above the pads 236 toward the lower reach 44 of the belt 30 about one-half inch (see FIGS. 6 and 10). The wheels 238 are provided to prevent the trailing edge of the sheet from engaging the rigid member 234 if the sheet is released prematurely.

The trail edge stop device 202 is mounted for movement toward and away from the lead edge stop device 200 in any conventional manner to accommodate varying widths of sheets to be stacked. One such manner will be now discussed with the understanding that the invention is not limited thereto.

Referring to FIGS. 9 and 10, the trail edge stop device 202 is mounted at each end to a plate 239 and the plates 239 are mounted for movement toward and away from the lead edge stop device 200. The plates 239 may be mounted for movement, as for example. by providing posts 240 and 242 on one side of the stacking station and posts 244 and 246 on the opposite side of the stacking station. A rigid cross member 248 is securely mounted at its ends to the posts 240 and 242. A rigid member 250 is securely mounted between cross member 248 and cross member 252 of the superstructure 28. On the opposite side of the stacking station, a rigid cross member 254 is securely mounted at its ends to the posts 244 and 246. A rigid member 256 is securely mounted between cross member 254 and rigid member 258, of the superstructure 28.

A guide rail 260 (see FIG. 10) is provided on each side of the stacking station. On one side, the guide rail is between post 262 of the superstructure 28 and member 250 and on the other side the guide rail is between post 264 of the superstructure 28 and member 256. The plate 239 is mounted on a guide rail 260 by providing each plate 239 with a pair of upper wheels 266 on one side of the guide rail 260 and a pair of lower wheels 268 on the other side of the guide rail as shown in FIG. 10.

The plates 239 are moved along their respective guide rail 260 by providing each plate with a threaded hole 270 and a rotatable threaded shaft 272 passing through the hole 270. On one side of the stacking station, one end of the shaft 272 is mounted for rotation at 274 on the post 262 and the other end of the shaft 272 is connected to a gear box 276 mounted on the member 250. The shaft 272 on the opposite side of the stacking station has one end mounted for rotation at 278 on the post 264 and the other end of the shaft is mounted in a gear box 280 on the member 256. A threaded drive shaft 282 has one end mounted in the gear box 276 and passes between the upper and lower reach of the belt 30 and through the gear box 280. Rotating the shaft 282 by wheel 284 in a first direction simultaneously moves the plates 239 and the trail edge stop device 202 away from the lead edge device 200, and rotating the shaft 282 in an opposite direction moves the trail edge stop device 202 toward the lead edge stop device 200 to accommodate various widths of sheets to be stacked.

With reference to FIG. 6, consider now the operation of the lead edge stop device 200 and the trail edge stop device 202 as a sheet 22 is released from the lower reach 44 of the belt 30. The sheet as it is released from the belt 30 moves along the trajectory path 192 and the leading edge of the sheet engages the pads 216 of the lead edge stop device 202. The sheet urges the channel member 209 and rigid members 212 and 214 against the shock absorber 230. The shock absorber 230 absorbs the force of the moving sheet. As the force of the sheet is absorbed, the sheet decelerate to zero acceleration and the trailing edge of the sheet drops down toward the receiving surface 188. The shock absorber 230 thereafter urges the channel member 209 and rigid members 212 and 214 away from the rigid member 204 to move the sheet toward the trail edge stop 202. The trailing edge of the sheet moves into engagement with the pads 236 of the trail edge stop device 202. The pads 236 absorb the force of the moving sheet and urge the sheet toward the lead edge stop device 200 to move the leading edge into engagement with the lead edge stop device 200. As the sheet reciprocates between the lead edge stop device 200 and the trail edge stop device 202, the sheet is lowered onto the receiving surface 188 on a cushion of air generated between the bottom surface 82 of the sheet 22 and the receiving surface 188.

The distance between the side of the stack adjacent the pads 236 and the pads 216 of the trail edge stop device 202 and lead edge stop device 200 respectively, at the plane of the receiving surface 188 is approximately 1/16 inch. Stated another way, the distance between the lead edge stop device 200 and the trail edge stop device 202 at the plane of the receiving surface 188 is about one-eighth inch greater than the length of the sheets to be stacked. If irregularities in the sides of the stack 170 are acceptable, the distance may be increased.

The surface of the pads 216 of the lead edge stop device 200 and the side adjacent thereto subtend an angle $\alpha$ which is between 3° to 10°. This prevents trail corner chipping. More particularly, if the surface of the pads of the lead edge stop device 202 are parallel to the adjacent side of the stack trail corner chipping occurs. This is because when the leading edge of the sheet engages the lead edge stop device, it urges it away from the adjacent side of the stack. The trailing edge of the sheet drops toward the receiving surface of the stack. When the sheet rebounds from the lead edge stop device to urge the sheet toward the trail edge stop device, the trailing edge of the sheet is on the receiving surface and slides therealong into enagement with the trail edge stop. This sliding of the trailing edge along the receiving surface chips the trailing edge and is referred to as trail corner chipping.

Inclining the surface of the pads of the lead edge stop device above the receiving surface 188 toward the trail edge stop stop device eliminates trail corner chipping. This is because the distance the sheet has to move away from the lead edge stop device 200 to engage the trail edge stop device is reduced and the trailing edge of the sheet is moved into engagement with trail edge stop device and not the receiving surface.

The angle $\alpha$ is a function of (1) the distance the lead edge stop device 200 is moved away from the adjacent side of the stack by the falling sheet; (2) the distance between the lead edge stop device and the trail edge stop device at the receiving surface 188; and (3) the distance from the receiving surface 188 that the lead edge stop device is engaged by the falling sheet. As can be appreciated, the ddistance the lead edge stop device 200 is moved away from the adjacent side of the stack by the falling sheet is a function of the force of the sheet e.g., weight and acceleration, and the biasing force of the shock absorbers.

For (1) a given distance between the trail edge stop device and the lead edge stop device at the receiving surface and (2) a given distance from the receiving surface that the lead edge stop device is engaged, the angle $\alpha$ increases as the distance of the lead edge stop device is moved away from the adjacent side of the stack by the falling sheet. For (1) a given distance that the lead edge stop device is moved away from the adjacent side of the stack by the sheet and (2) a given distance from the receiving surface that the sheet is engaged, the angle α increases as the distance between the lead edge stop device and trail edge stop device at the receiving surface increases. For (1) a given distance between the lead edge stop device and the trail edge stop device at the receiving surface and (2) a given distance the lead edge stop is moved away from the adjacent side of the stack by the falling sheet, the angle α decreases as the distance from the receiving surface that the lead edge stop is engaged by the falling sheet increases. It is recommended that the shock absorbers such as the adjustable type shock absorbers sold by ACE Controls, Inc., be adjusted for one-fourth inch to one-half inch movement.

It has been found that an angle of 5° prevents trail corner chipping when (1) the distance between the lead edge stop device and the trail edge stop device at the receiving surface are each 1/16 inch from the adjacent side of the stack, (2) the lead edge stop device is moved one-fourth inch to one-half inch away from the adjacent side of the stack by the moving sheet and (3) the sheet engages the lead edge stop device about 2 inches from the receiving surface.

With reference to FIG. 6, the pads 236 of the trail edge stop device 202 are about 1–2 inches below the lower reach of the belt and about 2 inches below the receiving surface. The receiving surface 188 is about 3–4 inches below the lower reach of the belt. The pads 216 of the lead edge stop device 200 is about 1 inch below the lower reach 44 of the belt 30 and about 2 inches below the receiving surface 188.

The leading edge stop device 200 and the trailing edge stop 202 satisfactorily aligns the leading edge, trailing edge and sides of the sheet with the receiving surface. However, since the sheets are not conveyed on the lower reach 44 of the belt 30 in side alignment with the receiving surface, it is recommended that side alignment members be provided to align the sides of the sheet with the stack.

With reference to FIG. 9, the discussion will now be directed to side alignment members 290 and 292 for aligning the sides of the sheet with the sides of the stack which has proven satisfactory. Side alignment members 290 and 292 are identical in construction and operation; therefore, the side alignment 290 will be discussed with the understanding that the discussion is applicable to the side alignment member 292 unless indicated otherwise.

The side alignment member 290 is provided with a rigid member 294 having a resilient surface 296 such as a pad similar to pad 216 of the lead edge stop device 200 to prevent damage to the side of the sheet. The rigid member 294 is slideably mounted to a plate 298 by way of shafts 300 (see FIG. 9). A double action piston 302 mounted to the plate 298, acts on the rigid member 294 to move the rigid member toward the side of the sheets to align the sides of the stack and away from the side of the stack when the sheets are dropped onto the receiving surface. The piston 302 may be activated in any conventional manner after the conveyor 20 starts to move the sheets toward the loading position 25 (see FIG. 2). For example, the piston 302 of each side alignment member may be connected to the fluid pressure supply 154 by a conduit 304 (see FIG. 3b). A solenoid 306 normally in the closed position is connected to a start button 308 by wire 309 (see FIG. 3a). Starting the conveyor 20, after the sheets have been programmed, moves the sheets into the load position 25 and opens the solenoid 306 to operate the piston 302. The rigid member 294 of the side alignment members 290 and 292 are moved toward the side of the stack to align the sheets on the stack. The solenoid 306 closes and the piston moves the rigid member 294 away from the sides of the stack.

Figure 11:
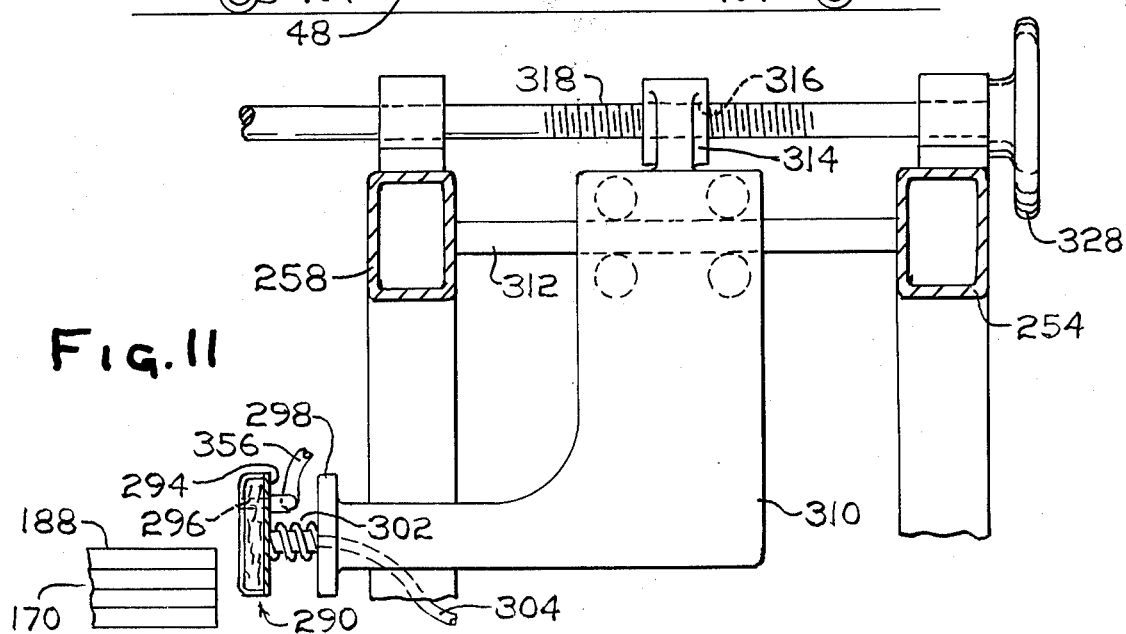
FIG. 11 is a view taken along lines 11—11 of FIG. 2.

It is recommended that the side alignment members 290 and 292 be adjustable relative to one another to accommodate various sheet lengths. This can be accomplished by using any of the well known expediencies. With reference to FIGS. 9, 10, and 11, there is shown an adjustable system for moving the side alignment members relative to one another to accommodate various widths of sheets to be stacked. This adjustable system provides accurate alignment of the slide alignment members to the stack as well as rigidity.

The discussion will be directed to the operation of the side alignment member 290 with the understanding that the discussion is applicable to side alignment member 292 unless indicated otherwise. The plate 298 is securely attached at its ends to a rigid plate 310 having a generally "L" shaped configuration (see FIG. 11). The plates are mounted for movement along a guide rail 312 in similar manner as the plate 239 is mounted for moving the trail edge stop device 202.

The plates 310 on each side of the stacking station are connected by a yoke 314 having a hole 316 receiving a threaded shaft 318 (shown better in FIG. 10). The threaded shaft 318 passes between the upper and lower reach of the belt 30 and is mounted for rotation at 320 on the cross member 248, at 322 and 324 on the cross member 252 and 258 respectively, of the superstructure 28 and 326 on the cross member 254 (see FIG. 9).

The threads on opposite ends of the shaft 318 have opposite pitch so that rotating the shaft 318 by wheel 328 in a first direction moves the side alignment members 290 and 292 toward each other and the side of the stack and rotating the shaft 318 in the opposite direction moves the side alignment members 290 and 292 away from each other and the sides of the stack. Normally, the distance between the side of the stack and adjacent the side alignment members 290 and 292 is about 2¼ inches.

As the belt 30 moves along its course, foreign particles e.g., pieces of glass, fall from the lower reach 44 of the belt onto the receiving surface 188. These foreign particles which can scratch the surfaces of the glass should be removed before sheets are stacked on the receiving surface.

Further, when the leading edge and trailing edge of the sheet of glass engages the lead edge stop device 200 and trail edge stop device 202, respectively, flares at the cut edges of the sheets break away as chips of glass and are projected over the surface 66 of the sheet. It has been found that when these chips are on the surface of the glass, they are difficult to remove.

With reference to FIGS. 7, 8 and 9, the discussion will now be directed to cleaning the receiving surface prior to stacking a sheet.

Mounted in the channel member 209 of the lead edge stop device 200 is a pair of nozzles 340. The nozzles 340 are connected to the pressurized fluid supply 154 by a conduit 342 for the first stacking station and conduit 344 for the second stacking station to move a stream of fluid e.g., air, over the receiving surface 188 at the first and second stacking station to remove foreign particles such as glass and dirt (see also FIG. 3b). Because the interleaver materials are applied to the bottom surface 86 of the sheet of glass, the uppermost surface 66 of the stacked sheet i.e., the receiving surface 183, when the sheet is stacked can be cleaned without removing any of the interleaver material.

With reference to FIG. 3b, solenoids 346 and 348 are mounted on the conduit 342 and 344 respectively, and is normally in the closed position. The solenoids 346 and 348 are opened as the sheet is released from the endless belt 30 toward the first and second stacking stations 50 and 52 respectively and closes when the sheet is on the receiving surface 183.

As can be appreciated, the duration that the solenoids 346 and 348 are open is not critical. It is only required that the receiving surface be cleaned prior to the next sheet being stacked. It is recommended that the nozzles be spaced at about one-fourth inch above the receiving surface and angled about 45° toward the receiving surface. This is so that air blast will not be directed against the bottom surface of the falling sheet as it moves along its trajectory path 192 thereby not disturbing the interleaver material on the bottom surface 82 of the sheet 22.

With reference to FIG. 9, it will be noted that the air stream from the nozzles 340 is fan-shaped and directed away from the center of the receiving surface 188 toward the sides of the receiving surface and not directed toward the trailing edge device 202. If the air was directed toward the trailing edge device 202 instead of over the sides of the receiving surface, particles of dust and glass would be trapped at the trailing edge device 202 and not be blown off the receiving surface. The fan-shaped stream of fluid e.g., air, can be achieved by providing rectangular shaped nozzles 3.16 × ⅞ inches. The spacing of the nozzles is not critical but the stream should cover the receiving surface.

As can be appreciated, the invention is not limited to the number of nozzles for cleaning the receiving surface. For sheets having a width of up to 80 inches, two nozzles spaced 40 inches apart and 20 inches from the adjacent side of the channel member 209 have been found to adequately remove foreign particles from the receiving surface. The air pressure required to clean the receiving surface varies as the width of the sheet varies. For example, as the width increases, the air pressure increases to assure that the total receiving surface is cleaned. As the width decreases, the required amount of air pressure decreases. For sheets having a width of up to 40 inches air pressure of about 80 psi are recommended. For sheets having a width greater than 40 inches, pressures greater than 80 psi are recommended.

With reference to FIGS. 6, 9 and 10, the discussion will now be directed to removing chips that break away from the leading edge and trailing edge of the sheet 22 as it engages the lead edge stop device 200 and trail edge stop device 202 respectively. A similar arrangement for removing chips is disclosed in U.S. patent application Ser. No. 424,586 filed even date in the name of D. A. Bollinger and W. P. Cathers and entitled "Device for Removing Chips From a Stacking Station" which disclosure is hereby incorporated by reference.

Mounted along one side of the stack are a plurality of nozzles 350, 352 and 354. Nozzles 350 are mounted in one of a side alignment member e.g., side alignment member 292. The nozzle 352 is advantageously mounted for adjustment on member 356 extending from side alignment member 290 and the nozzle 354 is advantageously mounted for adjustment on member 358 extending from trail edge device 202 as shown in FIG. 10. The nozzles 352 and 354 are adjustable to accommodate various sheet widths. The nozzles 350, 352, and 354 for the first stacking station 52 are connected by conduit 360 to the fluid pressure supply 154 and for the second stacking station 52 by conduit 362 to the fluid pressure supply 154 (see FIG. 3b). Solenoids 364 and 366 normally in the closed position are mounted in the conduits 360 and 362 of the first and second stacking stations 50 and 52 respectively.

The nozzles 350, 352, and 354 are arranged relative to the falling sheet of glass such that as the leading edge engages the lead edge stop device 200, a blast of air from the nozzles 350 and 352 blows streams of air from one side of the sheet to the opposite side as shown in FIG. 9 to blow away chips of glass while they are in the air. The solenoids 364 and 366 of the first and second stacking station 50 and 52 respectively remains open until the sheet of glass is on the receiving surface at the station.

Normally, the leading edge of the sheet engages the leading edge stop device 200 about 2 inches above the receiving surface 188 and the trailing edge engages the trail edge stop device about 2 inches above the receiving surface. The nozzles are spaced about 2½ inches above the receiving surface. If the blast of air from the nozzles 350, 352 and 354 is directed toward the bottom surface of the sheet, the interleaver material may be blown off. If the blast of air is directed too far above the uppermost surface 66 of the falling sheet the glass chips will not be blown away.

As can be appreciated, the invention is not limited to the number of nozzles for removing chips from the falling sheet. For sheets having a length of up to 76 inches, it is recommended that the nozzles 350 and 352 be spaced about 9 inches apart and about 2½ inches from the lead edge stop device 200. The nozzle 354 should be spaced about 2½ inches from the trailing edge device 202. To assure complete removal of the chips, the nozzles should have a rectangular shape 3/16 × ⅞ inch. This provides overlapping streams of air to assure complete removal of the chips from the uppermost surface 66 of the falling sheet (see FIG. 9).

Further, as the length of the sheet increases, the fluid pressure should increase. Pressure of 80 psi have been found to be satisfactory for moving chips across a sheet having a length of 80 inches. For sheets having a length greater than 80 inches, the recommended air pressure is greater than 80 psi.

The trajectory path 192 of the sheet as it is released from the belt 30 and moves toward the leading edge stop device 200 (see FIG. 6) is generally a function of the speed of the belt and the weight of the glass. As the speed of the belt increases for a given weight of a sheet, the arc of the trajectory increases; and as the speed of the conveyor decreases, the arc decreases. As the weight of the sheet increases for a given conveyor speed, the arc of the trajectory decreases and as the weight of the sheet decreases for the same conveyor speed, the arc of the trajectory path increases.

As can be appreciated, moving sheets of glass having the same trajectory path toward a stacking station is important. For example, if the trajectory path varies several detramental effects occur. Consider the following, if the trajectory path has a decreasing arc the leading edge of the sheet will not engage the pads of the lead edge stop device 200 but will hit the receiving surface. If the trajectory of the sheet has an increased arc, the leading edge of the sheet will be projected over the lead edge stop 200. Further, it is recommended that the leading edge of the sheet engage the pads of the leading edge stop at approximately the same position each time. This is so that the blast from the nozzles 350, 352 and 354 direct the stream of air over the uppermost surface of the sheet to blow the chips from the surface. If the blast of air is too high above the uppermost surface of the sheet, the chips may not be blown away. If the blast is directed below the sheet, then the interleaver material will be removed while the chips fall on the uppermost surface.

It is apparent therefore, that a system should be used which provides the same trajectory path for each subsequent sheet to be deposited on the stack so that the leading edge of the sheet engages the pads of the leading edge stop device 200. This permits the nozzles 350, 352 and 354 to be stationary relative to the trajectory path for blowing chips from the sheets. Further, it is recommended that a system be provided for automatically depositing the sheets in a selected one of the station e.g., the cullet bin, the first stacking station or in the second stacking station. With these requirements in mind, the discussion will now be directed to a monitoring system that provides all the above features. As will be appreciated, the discussion will be directed to general electrical system with the understanding that equivalent electrical systems can be used without deviating from the scope of the invention.

For purposes of the discussion, it is desired to deposit sheets in either the cullet bin 48, the first stacking station 50 or the second stacking station 52. As can be appreciated, the discussion is applicable to more or less stations. Further, the discussion will be directed to programming 4 sheets. As will be appreciated, the invention is not limited to the number of sheets.

Referring now to FIG. 3a and 3b, associated with each of the 4 sheets moved into the inspection station, (not shown) is a two deck switch 370, 372, 374, and 376. For example, switch 370 is associated with the first sheet moved into the inspection area. Switch 372 is associated with the second sheet moved into the inspection area. Switch 374 is associated with the third sheet moved into the inspection area, and switch 376 is associated with the fourth sheet moved into the inspection area.

Each switch is identical in construction and operation. Therefore, the discussion will be directed to switch 370 with the understanding that the discussion is applicable to the remaining switches 372, 374 and 376 unless indicated otherwise. With reference to switch 370, a deck 378 has three contacts 380, 382 and 384 and deck 386 has three contacts 388, 390 and 392. Contacts 380 and 388 are associated with the cullet bin 46. Contacts 382 and 390 are associated with the first stacking station 50. Contacts 384 and 392 are associated with the second stacking station 52.

Contact 380 of the deck 378 of each switch 370, 372 374 and 376 is connected to a binary number switch 394 associated with the cullet station 48; contact 382 of the deck 378 of each switch 370, 372, 374 and 376 is connected to a binary number switch 396 associated with the first stacking station 50; and contact 384 of the deck 378 of each switch 370, 372, 374 and 376 is connected to a binary number switch 398 associated with the second stacking station.

The binary number of the binary switches 394, 396 and 398 is a function of the distance between the loading position 25 and the release point for the cullet bin 46, the first stacking station 50 and the second stacking station 52 respectively. For example, conveyor 30 is normally operated at a set speed of about 214 feet per minute. As the weight of the sheet varies, the release point varies so that each sheet of the same weight has the same trajectory path.

Consider the following: for float glass 80 inches in length, 40 inches in width, and 3/32 inch thick, the sheet should be released 6 inches from the lead edge stop device 200. Since the lead edge stop device 200 is at a set position relative to the load station e.g., 18.0 feet, sheets of the above dimension programmed for the first stacking station should be released 17.5 feet from the load position. Therefore, the binary switch 396 associated with the first stacking station is set to a number to reflect the distance 17.5 feet. The same discussion is applicable to the cullet bin 46 and the second stacking station 52. However, as can be appreciated the switch 394 associated with the cullet bin is not as critical as the setting for the first and second stacking station 50 and 52 respectively.

Each of the binary switches 394, 396, and 398 are connected to AND circuits 402, 404, 406, and 408, associated with switches 370, 372, 374, and 376 respectively.

A ring counter oscillator sequencer 410 directs a signal to each of the switches 370, 372, 374, and 376, and sequentially energizes each of the AND circuits 402, 404, 406 and 408.

In operation, the sequencer circuit 410 directs a signal to switch 370 which in turn selects one of the binary number switches 394, 396, and 398 and energizes the AND circuits 402 so that a binary number corresponding to the disposition of the first sheet e.g., the sheet is either programmed for the cullet bin 46, first stacking station 50 or second stacking station 52 is moved into load section 412 of a preset counter 414 associated with the switch 370. Then, the sequencer 410 directs a signal to switch 372 which in turn selects one of the binary switches 394, 396, or 398 and energizes the AND circuits 404 so that a binary number corresponding to the disposition of the second sheet is moved into load section 416 of a preset counter 418 associated with the switch 372.

The sequencer 410 directs a signal to switch 376 which in turn selects one of the binary switches 394, 396, or 398 and energizes the AND circuits 406 so that a binary number corresponding to the disposition of the third sheet is moved into load section 420 of a preset counter 422 associated with the switch 374. The sequencer 410 directs a signal to switch 376 which in turn selects one of the binary switches 394, 396, or 398 and energizes the AND circuits 408 so that a binary number corresponding to the disposition of the fourth sheet is moved into load section 424 of the preset counter 426.

The signal forwarded into each of the load sections 412, 416, 420 and 424 of the preset counter 414, 418, 422 and 426 is the number of pulses which is a function of the distance between the load station and the release point for the sheet associated with the switches 370, 372, 374, and 376 respectively.

Connected to countdown section 428, 430, 432, and 434, of the preset counters 414, 418, 422 and 426 respectively, is a pulsing encoder 436 which is set to count pulses per unit of belt travel. In this manner, the system is independent of time and line speed. An oscillator sequencer circuit 438 is connected to each of the countdown sections 428, 430, 432 and 434 of the preset counter 414, 418, 422, and 426 respectively, by a wire 439 and is energized by a sensing device 440.

The sensing device is positioned at the loading position 25 and activates the sequencer circuit 438 each time a leading edge of the sheet moves past the sensing device 440.

As a leading edge of the first sheet moves past the sensing device 440, e.g., a photo-optic device, the sequencer 438 energizes countdown section 428 to transfer the number from the load section 412 to the countdown section 428 of the preset counter 414. The pulse coder 436 begins to count down the number, one digit per unit belt travel. Consider the following. If the sheet is programmed for the first stacking station, the number set on the binary switch 396 is, for example, 5,800 which corresponds to 17.5 feet from the sensing device 440 to the release point for the first stacking station. The belt speed is 214 feet per minute and the encoder pulse rate is 1,182 pulses per second. When the countdown section has a zero number, a signal is forwarded by wire 442 to each of three AND circuits 444, 446 and 448 associated with the switch 370.

As the leading edge of the second sheet passes the sensing device 440, a signal is forwarded from the sequencer circuit 438 to energize the countdown section 430 of the preset counter 418 to transfer the number from the load section 416 to the countdown section 430. The encoder 436 begins to count down the number, one pulse per unit time. When the number is zero, a signal is forwarded from the preset counter 418 by way of wire 450 to each AND circuit 452, 454 and 456 associated with the switch 372.

Similarly, as the leading edge of the third sheet moves past the sensing device 440, a signal is forwarded from the sequencer circuit 438 to energize the countdown section 432 of the preset counter 422 to transfer the number in the load section 420 to the countdown section 432. The pulse encoder 436 counts down the number, a digit per unit time. When the number is zero, a signal is forwarded from the preset counter 422 by way of wire 458 to AND circuits 460, 462 and 464 associated with the switch 374.

When the leading edge of the fourth sheet moves past the sensing device 440, a signal is forwarded from the sequencer circuit 438 to energize the countdown section 434 of the preset counter 426 to transfer the number in the load section 424 to the countdown section 434. The pulse encoder 436 counts down the number, a digit per unit time. When the number is zero, a signal is forwarded from the preset counter 426 by way of wire 466 to AND circuits 468, 470 and 472 associated with the switch 376.

The contacts 388, 390 and 392 of the deck 386 of each switch 370, 372, 374 and 376 is connected by way of wires 473, 474, and 475 respectively, to a memory bank 476, 477, 478 and 480 respectively. The memory banks 476, 477, 478 and 480 store the contact that is acctuated when the oscillator sequencer 410 directs a signal to each switch 370, 372, 374 and 376 respectively. By providing the memory banks with each switch it is possible to operate the switches for the next group of four sheets as the previous group of four sheets are being deposited in the respected ones of the stations 46, 50 and 52.

The memory bank 476 is connected to each one of the AND circuits 444, 446, and 448; the memory bank 477 is connected to each one of the AND circuits 452, 454, and 456; the memory bank 478 is connected to each one of the AND circuits 460, 462, and 464 and the memory bank 480 is connected to each of the AND circuits 468, 470 and 472.

As the sequencer 410 directs a signal through a selected one the contact 380, 390, and 392, on the deck 386, the signal is forwarded by way of the memory bank to a selected one of an AND circuit associated with the contact. The selected one of the AND circuits is energized by the signal from the preset counter associated with the switch and AND circuits. For example, contact 388 of the deck 386 of each switch 370, 372, 374, and 376 is associated through the memory bank 476, 477, 478, and 480 to AND circuits 444, 452, 460 and 468 respectively. The contact 390 of deck 386 of each switch 370, 372, 374, and 376 is associated through the memory bank 476, 477, 478, and 480 to the AND circuits 446, 454, 462, and 470 respectively. The contact 392 of the deck 386 of each switch 370, 372, 374, and 376 is associated through the memory bank 476, 477, 478, and 480 to AND circuits 448, 456, 464, and 472 respectively.

The AND circuits 444, 452, 460, and 468 when energized by preset counters 414, 418, 422 and 426 respectively, each operate to close the solenoid 78 which releases the sheet from the belt as the sheet moves past the vacuum chamber 56. The AND circuits 446, 454, 462, and 470 when energized by preset counters 414, 418, 422, and 426 respectively, each operate on the solenoid 84 to close the solenoid 84 and to operate timer 482. When the solenoid 84 is closed, the sheet is released from the belt 30 as the sheet moves past vacuum chamber 60. The timer first opens solenoids 346 and 364 to clean the receiving surface as the sheet is released from the belt and then solenoid 364 to remove chips from the uppermost surface 66 of the sheet when the leading edge of the sheet engages the lead edge stop device 200. When the sheet is on the receiving surface, the signal from the timer 482 is discontinued and the solenoids 346 and 364 close. The AND circuits 448, 456, 464 and 472 when energized by the preset counter 414, 418 422 and 426 respectively, each operate on the solenoid 86 to close the vacuum to vacuum chamber 64 to release the sheet at the second stacking and to operate the timer 484. The timer 484 operates on solenoids 348 and 362 in a similar manner as the timer 482 and solenoids 346 and 364 respectively, of the first stacking station.

DETAILED DESCRIPTION OF THE INVENTION

In the following example, groups of four (4) sheets of glass 22 are inspected and programmed for one of three stations; namely, a cullet bin 46, a first stacking station 50, or a second stacking station 52 (see FIG. 2). Further, the sheets of glass are visually inspected for size only and acceptable shets have a length of 80 inches, a width of 40 inches, and a thickness of 3/32 inch. At the first stacking station 50, the stack 170 requires one more sheet to complete the stack.

The second stacking station 52 is prepared for receiving sheets in the following manner. A platen 182 is moved along rollers 180 of the first section 174 toward rollers 184 of the second section 176 of the conveyor 172. The rollers 184 are operated to move the platen 182 onto the second section 176 beneath the belt 30. Elevator mechanism 186 moves the second section 176 and platen 182 toward the lower reach 44 of the belt 30. The surface of the platen i.e., the receiving surface 188 is spaced about 3½ inches from the lower reach 44 of the belt.

Pads 216 of the lead edge stop device 200 (see FIG. 6) are spaced about 1/16 inch from the adjacent side of the receiving surface 188 subtend an angle $\alpha$ of about 5° as shown in FIG. 6. The trail edge stop device 202 is positioned relative to the adjacent side of the platen 182 such that pads 236 are about 1/16 inch away from the adjacent side of the platen 182.

The top of pads 216 of the lead edge stop device 200 is about 1 inch away from the lower reach 44 of the belt 30, the top of pads 236 of the trail edge stop device 202 is about 2 inches away from the lower reach 44 of the belt 30, and wheels 238 are spaced about one-half inch away from the lower reach 44 of the belt 30 as viewed in FIG. 6. The pads 216 and 236 extend about 3 inches and 2 inches respectively, below the receiving surface 188.

Side alignment members 290 and 292 are spaced about 2 inches from the sides of the receiving surface 188 (see FIG. 9).

Referring to FIGS. 7 and 8, two (2) nozzles 340 are mounted in the lead edge stop device 200. The nozzles 340 are 3/16 × ⅞ inch and angled at about 45°. The nozzles 340 are spaced about 40 inches apart; about 20 inches from their adjacent side of the lead edge stop device 200; and about 1 inch above the receiving surface 188. The nozzles 340 remove foreign particles such as chips of glass and dirt from the receiving surface 188 by directing a fan shaped stream of fluid e.g., air, away from the center of the receiving surface toward the sides of the receiving surface 188 as shown in FIG. 9.

With reference to FIG. 6, mounted in side alignment member 292 are a pair of nozzles 350 spaced 9 inches apart and about 2¼ inch from the lead edge stop device 200. Nozzle 352 mounted on member 356 attached to the slide member 290 is spaced about 21 inches from the lead edge stop device. Nozzle 354 mounted on member 358 attached to the trail edge stop device 202 is spaced about 2½ inches from the pads 236 of the trail edge stop device 202.

The nozzles 350, 352 and 354 are similar in construction as nozzles 340 of the lead edge stop device 200 and are spaced about 2 inches above the receiving surface 188. The nozzles 350, 352 and 354 direct fan shaped streams of fluid e.g., air across the uppermost surface of the falling sheet to remove chips of glass that break away from the leading edge and trailing edge of the falling glass sheet (see FIG. 9).

The sheet of glass as it is released from the lower reach 44 of the belt 30 has a trajectory path 192 such that the leading edge of the sheet engages the pads 216 of the lead edge stop about 2 inches above the receiving surface 188. For sheets of glass 40 × 80 × 3/16 inches, the sheet should have a trajectory path of about 1 foot.

The distance between photo-optic device 440 at loading position 25 (see FIG. 3b) and the release point for the sheet to be deposited in the second stacking station is 23.5 feet. The belt 30 is continuously operated at a speed of about 214 feet per minute. Pulse encoder 436 (see FIG. 3a) counts about 1,182 pulses per second. Therefore, binary number switch 398 associated with the second station is set at 7,800.

The first stacking station 50 is partially loaded with sheets of glass 40 × 80 × 3/32 inches. The lead edge stop device 200; trail edge stop device 202; side alignment members 290 and 292; nozzles 340 of the lead edge stop device 202 of the first stacking station 50 has been previously adjusted in a similar manner as discussed for corresponding elements of the second stacking station 52. The release point for sheets programmed for the first stacking station 50 is 17.5 feet from the photocell 440 at the loading switch 25. The number on the binary number switch 396 associated with the first stacking station had been set at 5,800.

The release point for sheets programmed for the cullet bin 46 is 2.6 feet from the photo-optic device 440 at the loading position 25 and the number 900 has been set on binary switch 394 associated with the cullet bin 46.

The group of four sheets 22 are moved into an inspection station (not shown) on conveyor 20. The sheets are inspected and the first sheet has cracks and is programmed for the cullet bin by setting two deck switch 370 on contacts 380 and 388. The second sheet is acceptable and is programmed for the first stacking station by setting two deck switch 372 to contacts 382 and 390. The third sheet is acceptable but since the first stacking station is loaded all subsequent acceptable sheets are programmed for the second stacking station 52. The third sheet is programmed for the second stacking station by setting switch 374 to contacts 384 and 392. The fourth sheet is acceptable and programmed for the second stacking station by setting switch 376 to contacts 384 and 392.

Start button 308 (see FIG. 3a) is depressed to (1) start conveyor motor (not shown) of conveyor 20 to move the sheets along conveyor 20 toward the load position; (2) momentarily open solenoid 306 and; (3) energize ring counter oscillator sequencer 410.

Opening the solenoid 306 moves pressurized air from fluid pressure supply 154 to piston 302 of side alignment members 290 and 292 of the first and second stacking stations. At the first stacking station, the piston 302 urges rigid member 294 and pad 296 of the side members 290 and 292 toward the side of the stack 170 to align the sheets previously stacked. The solenoid 306 returns to its normally closed position and the rigid member 294 and pads 296 are moved away from the sides of the stack 170 by the piston 302. The side alignment members 290 and 292 at the second stacking stations are similarly operated.

Energizing the oscillator sequencer 410 sequentially (1) forwards a signal to the switches 370, 372, 374, and 376 and (2) energizes the AND circuits 402, 404, 406, and 408. More particularly, the oscillator sequencer 410 forwards a signal through contacts 380 and 388 of the switch 370 and energizes the AND circuits 402. A signal passes from contact 382 through the binary switch 394 and the binary number therefrom is forwarded through energized AND circuits 402 and set in load section 412 of preset counter 414. A signal passes through the contact 388 of the switch 370 to forward a signal through memory bank 476 to AND circuit 444.

The oscillator sequencer 410 forwards a signal through contacts 384 and 390 and energizes the AND circuits 404. A signal passes from contact 382 of the switch 372 through the binary switch 396 and the binary number therefrom is forwarded through energized AND circuits 404 and set in load section 416 of preset counter 418. A signal passes through the contact 390 of the switch 372 to forward a signal through memory bank 477 to AND circuit 454.

The oscillator sequencer 410 forwards a signal through contacts 384 and 392 of the switch 374 and energizes the AND circuits 406. A signal passes from contact 384 of the switch 374 through the binary switch 398 and the binary number therefrom is forwarded through energized AND circuits 406 and set in load section 420 of preset counter 422. A signal passes through the contact 392 of the switch 374 to forward a signal through memory bank 478 to AND circuit 464.

The oscillator sequencer 410 forwards a signal through contacts 384 and 392 of the switch 376 and energizes the AND circuits 408. A signal passes from contact 384 of the switch 376 through the binary switch 398 and the binary number therefrom is forwarded through energized AND circuits 408 and set in load section 424 of present counter 426. A signal passes through the circuit 392 of the switch 376 to forward a signal through memory bank 480 to AND circuit 472.

If desired, the switches 370, 372, 374 and 376 can be used to program the next group of four sheets. This is because the binary numbers are stored in load sections 412, 416, 420, and 424 of preset counters 414, 418, 422, and 426 respectively, and contact position of switches 370, 372, 374, and 376 is stored in memory banks 476, 477, 478, and 480 respectively.

As the leading edge of the first sheet moves past the photo-optic device 440, a signal is forwarded to oscillator sequencer circuit 438. The sequencer circuit 438 energizes countdown section 428 of the preset counter 414 to transfer the binary number in the load section 412 to the countdown section. Pulse encoder 436 counts down the binary number 1,182 digits per second.

The first sheet moves under and into engagement with the lower reach 44 of the belt 30 and is held there by the vacuum from vacuum chamber 54. Vacuum pressure of 15 inches of water is sufficient to hold the sheet to the lower reach 44 of the belt 30. As the first sheet approaches the release point for the cullet bin, the binary number in the countdown 428 of the preset counter 44 approaches zero. When the number is zero, a signal is forwarded to energize the AND circuit 444 to close the solenoid 78 at the instant the first sheet is at the release point. The first sheet falls from the lower reach of the belt into the cullet bin 46.

Following the first sheet, the leading edge of the second, third and fourth sheet sequentially moves past the photo-optic device 440 to sequentially actuate the sequencer circuit 438. The sequencer circuit sequentially energizes the countdown section 430, 432, and 434 of preset counters 418, 422 and 426 respectively, to transfer the binary number in the load section 461, 420 and 424 to the countdown sections 430, 432, and 434 respectively. The pulse encoder 436 begins counting down the number in each countdown section 1,182 digits per second.

The second, third and fourth sheets are held to the lower reach 44 of the belt 30 by vacuum from vacuum chambers 54, 56 and 58 as the sheets move toward the first stacking station 50. As the sheets move toward interleaver station 48, the sheets sequentially actuate microswitch 158. The microswitch 158 opens the solenoid 156 to move air under 5 psi through slot nozzle 146. The air from the slot nozzle 146 is directed through a 50 × 50 mesh steel screen 140 having interleaver material 80 such as Poly-Tek(R). The screen is rotated at about 20 feet per minute by power roller 122 about an endless path defined by idler rollers 112 and power roller 122 through interleaver material 80 in a container 102 and beneath the lower reach of the belt 30.

As the portion of the screen 140 moves over idler rollers 112, it is parallel to the lower reach 44 of the belt 30 and spaced about 4 inches therefrom.

The interleaver material 80 is blown from the screen between static tubes 164 onto bottom surface 82 of the glass sheet. As the trailing edge of the sheet moves past the microswitch 158, the solenoid 158 closes and remains closed until engaged by the next sheet.

As the second, third and fourth sheet are continuously conveyed by the belt 30 toward the stacking stations, the numbers in the countdown section 430, 432 and 434 approach zero.

When the number in the countdown section 430 of the preset counter 418 is zero, a signal is forwarded to energize AND circuit 454. The AND circuit 454 forwards a signal to the solenoid 84 and timer 482. The solenoid 84 momentarily closes as the second sheet approaches the release point for the first stacking station. The second sheet is released and moves along a trajectory path 192 toward the lead edge stop device 200 of the first stacking station 50. Simultaneously, the timer 482 opens solenoid 346 to move pressurized air across the receiving surface 188 to remove particles of dirt and glass.

The leading edge of the sheet engages the pads 216 and urges channel member 209 against shock absorbers 230.

The timer 482 then opens the solenoid 364 to move air through the nozzles 350, 352 and 354. As the leading edge of the sheet engages the pads 216 of the lead edge stop device 200, flares at the leading edge are loosened and projected over the uppermost surface 66 of the sheet 22. The nozzles 350 and 352 blow their chips across the uppermost surface 66 of the sheet away from the stacking station 50.

The shock absorber 230 deaccelerates the sheet to zero acceleration and then urges the channel member 209 toward the trail edge stop device 202 to move the trailing edge of the sheet toward the trail edge stop device 202.

The trailing edge of the sheet drops by gravity beneath the top of the pads 236 of the trail stop device 202 and is moved into engagement with the pads 236 as the sheet rebounds from the lead edge stop device 200. When the trailing edge of the sheet engages the pads 236, flares at the trailing edge break away as chips of glass which are propelled over the uppermost surface 66 and blown away by the nozzle 354.

The sheet reciprocates between the load edge stop device 200 and trail edge stop device 202 as it lowers on an air cushion onto the receiving surface 188 of the stack. The air cushion is generated by the falling sheet.

When the sheet is on the receiving surface, the timer 482 closes solenoids 346 and 364. A sensing device (not shown) maintains the level of the stack constant by operating on the elevator mechanism 186 to lower the second section 176 of the conveyor 172 each time a sheet is deposited.

The third and fourth sheets are held to the lower reach of the belt 44 by vacuum chambers 60 and 62 and moved toward the second stacking station. As the third and fourth sheet approach the release point for the second stacking station 52, the number in the countdown section 432 of the preset counter 422 and in countdown sections 434 of preset counter 426 approach zero.

When the count in the countdown section 432 is zero, a signal is forwarded from the preset counter 422 to energize AND circuit 464. The AND circuit 464 forwards a signal to close solenoid 86 and actuate timer 484. Closing the solenoid 86 releases the sheet at the release point along a trajectory path toward the lead edge stop device 200 at the second stacking station 52. The timer 484 opens the solenoid 348 and 366 to move pressurized air through nozzles 340, 350, 352 and 354 respectively at the second stacking station in a similar manner as discussed for the first stacking station.

The third sheet is stacked at the second stacking station in a similar manner as the second sheet was stacked in the first stacking station.

When the countdown section 434 of the preset counter 426 is zero, a signal is forwarded to energize the AND circuit 472 to open solenoid 86 and energize timer 484. The sequence of steps described for stacking the third sheet at the second stacking station are repeated for stacking the fourth sheet at the stacking station.

The next group of four sheets are inspected and the stacking cycle repeated.

At the first stacking station, the elevator mechanism 186 aligns the second section 176 and the third section 178. The rollers 184 and 190 are rotated to move the stack along the conveyor 172 away from the first stacking station as an empty platen is moved over the second section 176 of the conveyor 172.

What is claimed is:

1. In an apparatus for stacking individual sheets on a receiving surface wherein the apparatus is of the type having a loading position; conveying means movable along a path spaced above the receiving surface and the loading position for engaging successive, individual sheets at the loading station and for conveying the individual sheets toward the receiving surface; and means operating on the conveyor means for releasing the sheet therefrom to move the sheet along the trajectory path toward the receiving surface, the improvement comprising:

means mounted about the receiving surface for engaging the sheet as it moves along the trajectory path and for aligning the sheet with the receiving surface, said engaging and aligning means includes:

a first means mounted in the trajectory path of the sheet for engaging the leading edge of the sheet as it moves along the trajectory path and for imparting sufficient force to the sheet to move the sheet in an opposite direction; and a second means in spaced alignment with said first engaging and imparting means for engaging the trailing edge of the sheet and imparting sufficient force to move the leading edge of the sheet into engagement with said first absorbing and imparting means wherein said first and second absorbing and imparting means confines the sheet to a reciprocating path spaced above the receiving surface and the distance between the sheet and the receiving surface decreases as the sheet reciprocates between said first and second absorbing and imparting means;

first means for cleaning the receiving surface prior to stacking a sheet;

second means for cleaning the uppermost surface of the sheet as the sheet engages said engaging and aligning means;

means for monitoring the movement of a sheet as it moves along the path from the loading position toward the receiving position; and means responsive to said monitoring means for actuating the releasing means to release the sheet from the conveyor means to move the sheet along the trajectory path into engagement with said engaging and aligning means.

2. The improved apparatus as set forth in claim 1 further including:

means positioned between the loading position and the receiving surface for applying interleaver material to the surface of the glass to be positioned on the receiving surface.

3. The improved apparatus as set forth in claim 2 wherein said means for applying interleaver material includes:

means for moving the interleaver material along a confined path wherein a portion of the path is generally parallel to and below the conveying means; and means for urging the interleaver material from said moving means into engagement with the surface of the sheet to be stacked on the receiving surface.

4. In an apparatus for stacking individual sheets on a receiving surface wherein the apparatus is of the type having a loading position; conveying means movable along a path spaced above the receiving surface and the loading position for engaging successive, individual sheets at the loading station and conveying the individual sheets toward the receiving surface; and means operating on the conveying means for releasing the sheet therefrom to move the sheet along a trajectory path toward the receiving surface; the improvement comprising:

means mounted about the receiving surface for engaging the sheet as it moves along the trajectory path and for aligning the sheet with the receiving surface;

means positioned between the loading position and the receiving surface for containing interleaver material to be applied to the surface of the glass to be positioned on the receiving surface;

a perforated endless conveyor for conveying the interleaver material;

means for mounting said endless conveyor on said containing means and for moving said endless conveyor along a confined path through the interleaver material such that a portion of said endless conveyor path is generally parallel to and below the conveying means;

means for moving a fluid through said perforated, endless conveyor to move the interleaver material from the conveyor onto the surface of the sheet to be stacked on the receiving surface;

means responsive to the movement of the sheet along the conveyor means for actuating said mounting and moving means as the sheet passes over that portion of said endless conveyor generally parallel with the conveying means;

first means for cleaning the receiving surface prior to stacking a sheet;

second means for cleaning the uppermost surface of the sheet as the sheet engages said engaging and aligning means;

means for monitoring the movement of the sheet as it moves along the path from the loading position toward the receiving position; and means responsive to said monitoring means for actuating the releasing means to release the sheet from the conveyor means to move the sheet along the trajectory path into engagement with said engaging and aligning means.

5. The improved apparatus as set forth in claim 1, wherein said monitoring means includes:

circuit means for storing a predetemined pulse count wherein the pulse count is a function of the distance between the load position and the position along the path where the sheet is to be released to move along the trajectory path toward the receiving surface; and circuit means operating on said storing circuit means when the sheet moves from the loading position toward the receiving surface for pulse counting, wherein the pulse count is a function of time and speed of the conveying means, said pulse counting circuit means actuating the release means when the pulse count of said pulse counting means equals the predetermined pulse count.

6. The improved apparatus as set forth in claim 1, wherein the sheet is a sheet of glass.

7. The improved apparatus as set forth in claim 1 wherein said first absorbing and imparting means includes:

resilient means movably mounted in the trajectory path of the sheet for preventing edge damage to the leading edge of the sheet; and shock absorbing means acting on said resilient means to absorb the force of the sheet as it moves into engagement with said resilient means and to urge the sheet away from said resilient means.

8. The improved apparatus as set forth in claim 7 further including:

means for mounting said resilient means such that the surface of said resilient means and a line normal to the receiving surface subtends an oblique angle to prevent the trailing edge of the sheet from engaging the receiving surface as the sheet is moved toward said second absorbing and imparting means.

9. The improved apparatus as set forth in claim 1, said first cleaning means includes:

means for directing a stream of air over the receiving surface to clean the receiving surface at a time prior to the sheet engaging the receiving surface.

10. The improved apparatus as set forth in claim 1 wherein said second cleaning means includes:

means for directing a stream of air across the uppermost surface of the sheet in a direction transverse to the path of the conveying means as the sheet engages said engaging and aligning means.

11. The improved apparatus as set forth in claim 1 wherein said actuating means further includes:

a means for actuating said first cleaning means to clean the receiving surface as the sheet is released from the conveying means and said second cleaning means to remove particles from uppermost surface of the sheet as the sheet engages said engaging and aligning means.

12. In an apparatus for depositing selected ones of a plurality of sheets at selected ones of a plurality of locations wherein at least one of the locations includes a receiving surface, wherein the apparatus is of the type having a loading position; conveying means movable along a path spaced above the locations and the loading position for engaging successive individual sheets at the loading station and for conveying the individual sheets toward the locations; and means operating on the conveying means for releasing individual sheets therefrom at a selected ones of a plurality of predetermined points along the conveyor path to move the sheet along a trajectory path towards a selected one of the locations wherein selected ones of the predetermined points are associated with selected ones of the locations, the improvement comprising:

side alignment means positioned about the at least one receiving surface to align the stacked sheets;

a first means mounted at the at least one receiving surface and in the trajectory path of the sheet for engaging the leading path of the sheet as it moves along the trajectory path and for imparting sufficient force to the sheet to move the sheet in an opposite direction;

a second means in spaced alignment with said first engaging and imparting means for engaging the trailing edge of the sheet and imparting sufficient force to move the leading edge of the sheet into engagement with said first absorbing and imparting means wherein said first and second absorbing and imparting means confines the sheet to a reciprocating path spaced above the receiving surface and the distance between the sheet and the receiving surface decreases as the sheet reciprocates between said first and second absorbing and imparting means;

first means mounted adjacent said first engaging and imparting means for directing a fluid stream of air over the receiving surface to clean the receiving surface at a time prior to the sheet engaging the receiving surface;

second means mounted between said first and second engaging and imparting means and spaced from a side of the receiving surface for directing a stream of air across the uppermost surface of the sheet in a direction transverse to the path of the conveying means as the sheet engages said first and second engaging and imparting means;

circuit means for storing a plurality of individual predetermined pulse counts wherein each individual pulse count is a function of the distance between the load position and a one of the predetermined points along the path where the sheet is to be released to move along the sheet along the trajectory path toward a selected one of the locations;

circuit means operating on said storing circuit means for pulse counting when the sheet moves from the loading position toward the locations where the pulse count is a function of time and speed of the conveying means;

means responsive to said pulse counting means for (1) actuating the releasing means to release the sheet from the conveyor means when the pulse count equals a one of the predetermined pulse counts (2) actuating said first cleaning means when the sheet is released toward the at least one receiving surface and (3) for actuating said second cleaning means when the sheet engages the first engaging and imparting means; and means (1) for starting the conveying means to engage successive individual sheets and convey the sheets from the loading position toward the locations; (2) for moving said side alignment means and (3) actuating said storing circuit means and said pulse counting circuit means.

\* \* \* \* \*

UNITED STATES PATENT OFFICE
CERTIFICATE OF CORRECTION

PATENT NO. : 3,907,127

DATED : September 23, 1975

INVENTOR(S) : Dwight A. Bollinger et al.

It is certified that error appears in the above-identified patent and that said Letters Patent are hereby corrected as shown below:

Claim 12, line 21, "path" should be --edge--.

Signed and Sealed this sixteenth Day of December 1975

[SEAL]

Attest:

RUTH C. MASON
*Attesting Officer*

C. MARSHALL DANN
*Commissioner of Patents and Trademarks*